Patented Nov. 20, 1934

1,981,068

UNITED STATES PATENT OFFICE 1,981,068

SOLUTION PURIFICATION

Oliver C. Ralston and Fay H. Miller, Clarkdale, Ariz., assignors to United Verde Copper Company, a corporation of Delaware No Drawing. Application June 2, 1931, Serial No. 541,632

11 Claims. (Cl. 23—125)

This invention relates to solution purification and has for an object the provision of an improved method for purifying zinc salt solutions. More particularly, the invention contemplates the provision of an improved method for removing cadmium from zinc salt solutions.

Zinc salts have many industrial applications. Thus, for example, solutions of zinc sulphate are employed in the manufacture of lithopone and in electrolytic processes for the recovery of metallic zinc, and zinc chloride is used in timber preservation, flux making, and hard fibre manufacture.

Zinc salts employed in industry are obtained from ores in which zinc minerals are associated with one or more minerals containing elements such, for example, as cadmium, copper, cobalt, lead or arsenic. The zinc may be recovered from the ore as metallic zinc by smelting or as zinc salt solutions by leaching with a suitable solvent, after conversion of the zinc compound of the ore to a soluble form when necessary. The desired zinc salt for industrial use may be produced by treating metallic zinc with a suitable reagent or by employing a suitable solvent in leaching the ore.

In treating zinc ore, it is difficult or impossible to obtain a pure product either by means of a smelting operation or by means of a leaching operation. The products of the smelting and leaching operations usually contain substantial amounts of cadmium and frequently contain small amounts of cobalt, copper, lead, arsenic and other elements which are associated with the zinc mineral in the ore. It is usually desirable to eliminate or remove such elements from the products of the leaching and smelting operations because of the fact that they are present in commercial amounts and/or because their presence is harmful in subsequent operations involving the use of the products or compounds obtained from the products.

According to some heretofore customary practices, solutions of contaminated zinc salts are subjected to the action of metallic zinc for the purpose of separating impurities such as copper and cadmium. While copper may be reasonably readily removed from zinc salt solutions by means of the heretofore customary purification operations, considerable difficulty attends the removal of cadmium, particularly when copper is also present, as is frequently the case.

We have discovered that purification operations may be so controlled that copper, the presence of which in a zinc salt solution from which it is desired to remove cadmium has been considered to be objectionable, may be utilized to promote cadmium removal. We have found that when controlled amounts of copper are present in zinc salt solutions cadmium precipitation by means of metallic zinc is promoted.

For solution purification, it is customary to employ metallic zinc in the form of zinc dust, and, in order to effect a reasonably satisfactory removal of cadmium by means of the heretofore customary methods, it is necessary to subject the zinc salt solutions to repeated treatments with zinc dust. The results of our investigations show that when the copper content of a zinc salt solution is greater than about 0.5 gram per liter of solution, the amount of zinc dust required to precipitate cadmium and prevent its subsequent oxidation and re-solution increases in approximately the same ratio as the copper content of the solution. The results of our investigations also show that, when copper is present in an amount equivalent to not less than about 0.25 gram and not more than about 0.50 gram per liter of solution, the quantity of zinc dust necessary to precipitate a given quantity of cadmium as sponge metal is much less than is necessary for precipitating the same amount of cadmium from solutions containing no copper. While the optimum results may be obtained when solutions containing about 0.25 to about 0.50 gram of copper per liter are employed, we have found that copper in amounts as small as about 0.12 gram and as great as about 1.0 gram per liter of solution aids in cadmium precipitation.

The purification method of our invention utilizes the effect of copper in cadmium precipitation. A method of our invention may comprise the establishment in a cadmium contaminated zinc salt solution of an amount of copper equivalent to not less than about 0.12 gram and not more than about 1.0 gram per liter of solution, and, preferably, not less than about 0.25 gram and not more than about 0.50 gram per liter of solution.

Suitable amounts of copper may be established in any desired manner. Thus, for example, copper may be incorporated in a solution which is deficient in copper by adding a suitable soluble copper salt, and a solution which contains an excessive amount of copper may be treated to precipitate a portion of the copper.

In removing cadmium from a zinc salt solution which is deficient in copper, we prefer to establish in the solution an amount of copper equivalent to from 0.25 to 0.50 gram per liter of solution by adding a suitable amount of a copper salt corresponding to the zinc salt of the solution and then agitate the solution in the presence of an amount of zinc dust slightly in excess of that required to precipitate the copper and cadmium and other precipitable elements which may be present.

In removing cadmium from a zinc salt solution which contains an excessive amount of copper, we prefer to reduce the copper content to establish in the solution an amount of copper equivalent to from 0.25 to 0.50 gram per liter of solution by subjecting the solution to the action of an appropriate amount of metallic zinc or zinc oxide. The precipitate may be separated from the solution by filtration or by settling and decantation. The partially purified solution is then preferably subjected to the action of an amount of zinc dust slightly in excess of that required to precipitate the copper and cadmium and other precipitable elements which may be present.

If the excess copper is precipitated by means of metallic zinc, separation of the solution and the cement copper by filtration is quite simple. The step of removing excess copper may also be utilized for removing other precipitable impurities which may be present. Conditions may be so adjusted, for example, that cobalt, arsenic and tellurium which can be precipitated with copper will come down with the cement copper. A two stage zinc dust treatment may thus be employed to first effect a copper-cobalt removal and then a cadmium removal. Filtration for both stages is rapid, convenient and inexpensive and permits segregation of the cadmium in a relatively concentrated product.

In conducting our researches for the purpose of determining the effect of copper on cadmium precipitation, we discovered that the presence of lead in addition to copper renders cadmium precipitation even more difficult than when excessive amounts of copper are present and lead is absent. When lead is present with copper greater quantities of zinc dust are necessary to precipitate cadmium than when lead is absent. The harmful effect of lead is felt even when the lead is present only as a lining for the precipitating receptacle. This discovery is important in view of the fact that lead lined receptacles are frequently employed in carrying out the heretofore customary purification methods.

We prefer to so conduct the method of our invention as to avoid contact of the solution with metallic lead.

Purification of zinc salt solutions is carried out extensively in connection with processes for recovering metallic zinc electrolytically.

Electrolytic zinc is produced mainly from zinc sulphide ore concentrates which usually contain varying amounts of copper, cadmium, cobalt, arsenic, antimony and other elements which if present in electrolytes reduce the efficiency of electrolytic processes. It is customary to subject the concentrates to oxidizing roasting operations and leach the roasted product with a sulphuric acid solution to obtain a solution of zinc sulphate. It is impossible to avoid obtaining a zinc sulphate solution contaminated with impurities such as copper, cadmium, cobalt, arsenic, antimony and other similar elements when such elements are present in the concentrates. It is, therefore, usually necessary to subject zinc sulphate solutions obtained by leaching roasted ores or concentrates with sulphuric acid to suitable purification treatments.

According to some heretofore customary practices, the impure zinc sulphate solutions are repeatedly agitated in lead lined receptacles with amounts of zinc dust greatly in excess of the amounts theoretically required to precipitate all of the impurities. Agitators comprising lead coated impellers and impeller shafts are sometimes employed. Repeated treatment of the solutions is required chiefly because of the difficulty experienced in effecting satisfactory cadmium elimination. As hereinbefore pointed out cadmium precipitation is inhibited by the presence of copper and lead. A portion of the difficulty in removing cadmium may, therefore, be attributed to the presence of excessive amounts of copper in the solutions and a portion may be attributed to the use of lead lined receptacles and other lead coated apparatus.

Improved results may be obtained by reducing the amount of copper in the solution and/or by avoiding contact of the solution with metallic lead, or in other words, by eliminating the use of lead lined receptacles and other lead coated apparatus.

We have discovered that it is possible to actually remove substantially all of the cadmium from zinc sulphate solutions momentarily when excessive amounts of copper are present, but oxidation and subsequent re-solution of the precipitated cadmium begins almost immediately, and it is practically impossible to filter the solution away from the precipitated copper and cadmium sufficiently rapidly to avoid re-solution of at least a portion of the precipitated cadmium.

According to one modification of our invention, we propose to modify the heretofore customary purification methods for the treatment of zinc sulphate solutions containing cadmium and excessive amounts of copper by subjecting the solution to the action of an amount of zinc dust sufficient to reduce the copper content to the desired extent and precipitate other impurities such as cobalt, arsenic and antimony but insufficient to effect, in addition, precipitation of a substantial amount of the cadmium. The partially purified solution is separated from the precipitate by filtration and subjected to the action of zinc dust to precipitate the cadmium and the remaining copper. The treatment of the impure solution for the reduction of the copper content may be carried out in a lead lined receptacle, but we prefer to conduct the cadmium precipitation in a receptacle having an inner surface comprising a non-metallic or organic material such, for example, as wood or rubber in order to avoid the harmful effects of lead and other metals. Our proposed procedure for the treatment of solutions containing excessive amounts of copper results in the recovery of a relatively pure cadmium product and the production of solutions which uniformly contain less than three milligrams of cadmium per liter of solution.

The effect of copper in different amounts on the precipitation of cadmium is illustrated by the following examples:—

*Example I*

Zinc dust equivalent to 13 grams of metallic zinc per liter of solution was added to a zinc sulphate solution heated to 65° C. and containing Cadmium_____300 milligrams per liter
Copper_____7 grams per liter
Zinc_____125 grams per liter The solution was stirred for a period of one hour, and allowed to stand 24 hours. At the end of this time, analysis of the solution showed cadmium to be present therein in the amount of 75 milligrams per liter.

The amount of zinc dust employed in excess of that required to precipitate the copper was equivalent to more than 33 times the theoretical amount of metallic zinc required to precipitate all of the cadmium.

Example II

Zinc dust equivalent to 3.5 grams of metallic zinc per liter of solution was added to a zinc sulphate solution heated to a temperature of 65° C. and containing Cadmium_____300 milligrams per liter
Copper_____1 gram per liter
Zinc_____125 grams per liter The solution was stirred for a period of one hour and allowed to stand 24 hours. At the end of this time, analysis of the solution showed only a trace of cadmium to be present.

The amount of zinc dust employed in excess of that required to precipitate the copper was equivalent to about 14.2 times the theoretical amount of metallic zinc required to precipitate all of the cadmium, but the excess was less than 50% of the excess employed to effect incomplete precipitation of a like amount of cadmium from a solution containing 7 grains of copper per liter, as in Example I.

Example III

Zinc dust equivalent to 1.5 grams of metallic zinc per liter of solution was added to a zinc sulphate solution heated to a temperature of 65° C. and containing Cadmium_____300 milligrams per liter
Copper_____0.5 grams per liter
Zinc_____125 grams per liter The solution was stirred for a period of one hour and allowed to stand 24 hours. At the end of that time analysis of the solution showed no cadmium to be present.

The amount of zinc dust employed in excess of that required to precipitate the copper was equivalent to about 5.65 times the theoretical amount of metallic zinc required to precipitate all of the cadmium, but the excess was only about 17% of the excess employed in Example I and less than 40% of the excess employed in Example II.

Example IV

Zinc dust equivalent to 4.0 grams of metallic zinc per liter of solution was added to a zinc sulphate solution heated to 65° C. and containing Cadmium_____300 milligrams per liter
Copper_____Nil per liter
Zinc_____125 grams per liter The solution was stirred for a period of one hour and allowed to stand 24 hours. At the end of that time analysis of the solution showed cadmium to be present therein in the amount of 60 milligrams per liter.

The amount of zinc dust employed was equivalent to about 23 times the theoretical amount of metallic zinc required to precipitate all of the cadmium and more than 4 times the amount employed to effect complete precipitation of a like amount of cadmium from a solution containing 0.5 grams of copper per liter, as in Example III.

The following example illustrates the effects of copper alone and lead and copper on cadmium precipitation:

Example V

A sample of zinc sulphate solution containing
Copper_____3.64 grams per liter
Cadmium_____100 milligrams per liter was heated to a temperature of 65° C. in a glass lined receptacle. Zinc dust equivalent to 5.14 grams of metallic zinc per liter of solution was added to the heated solution. The solution was stirred for a period of one hour and allowed to stand 24 hours.

A sample of the same original solution was treated in the same manner in a lead lined receptacle.

After the above operations, the sample which had been treated in the glass lined receptacle contained no cadmium, and the sample which had been treated in the lead lined receptacle contained 52 milligrams of cadmium per liter.

In each case, the amount of zinc dust employed in excess of that required to precipitate the copper was equivalent to more than 24 times the theoretical amount of metallic zinc required to precipitate all of the cadmium.

While we do not wish to be bound by the following hypothesis, we are of the opinion that the removal of cadmium from zinc bearing solutions in which copper is present depends partially upon the action of a copper-zinc couple, and that the couple functions best when certain minor amounts of copper are present; furthermore, that when copper is present in greater quantities than certain minor amounts, the action of the copper-zinc couple is retarded, due possibly to the covering, filming or blanketing effect of the precipitated copper on the zinc dust particles added for precipitation purposes.

Re-solution of cadmium from the precipitate is also most active with precipitates of high copper content, seemingly taking place even when access of air is practically prevented. We have ascribed this to the presence of sufficient copper to form a copper-cadmium couple in which cadmium goes into solution and hydrogen, copper or similar elements are deposited on the copper surface. Naturally, access of air greatly accelerates this action through continued re-oxidation of various elements in the precipitate. Whether the hypothesis is correct is not important, the fact remains that large amounts of copper cause more rapid re-solution of cadmium.

In a solution devoid of copper, cadmium will plate the zinc dust surfaces so that re-solution of cadmium may easily take place without much protective effect from the zinc dust, whereas in the presence of a small amount of copper, a zinc-copper couple is formed and precipitation of cadmium takes place mainly on copper surfaces leaving some free zinc surfaces to keep the couple active.

The action of the lead is more difficult to explain, but it was repeatedly noticed that the removal of cadmium was less effective when precipitation took place in lead lined apparatus than when done in glass or wooden tanks. It is possible that the zinc dust surface is too small in comparison with the copper-lead-cadmium surfaces exposed under these conditions and cannot properly prevent local couples of copper-cadmium or lead-cadmium from coming into play. It is certain that the whole submerged lead lining of the tank becomes plated with copper and probably cadmium which would not be in adequate contact with metallic zinc and should therefore be more subject to re-solution.

We claim:—

1. The method of removing cadmium from a zinc salt solution which comprises establishing in the solution an amount of copper equivalent to not less than about 0.12 gram and not more than about 1.0 gram per liter of solution, and subjecting the resulting solution to the action of metallic zinc.

2. The method of removing cadmium from a zinc salt solution which comprises establishing in the solution an amount of copper equivalent to not less than about 0.25 gram and not more than about 0.50 gram per liter of solution, and subjecting the resulting solution to the action of metallic zinc.

3. The method of removing cadmium from a zinc salt solution which comprises incorporating in the solution an amount of copper equivalent to not less than about 0.12 gram and not more than about 1.0 gram per liter of solution, and subjecting the resulting solution to the action of metallic zinc.

4. The method of removing cadmium from a zinc salt solution which comprises incorporating in the solution an amount of copper equivalent to not less than about 0.25 gram and not more than about 0.50 gram per liter of solution, and subjecting the resulting solution to the action of metallic zinc.

5. The method of purifying a zinc salt solution containing copper and cadmium which comprises treating the solution to establish therein an amount of copper not less than about 0.12 gram and not more than about 1.0 gram per liter of solution, and subjecting the resulting solution to the action of metallic zinc to precipitate copper and cadmium.

6. The method of purifying a zinc salt solution containing copper and cadmium which comprises treating the solution to establish therein an amount of copper not less than about 0.25 gram and not more than about 0.50 gram per liter of solution, and subjecting the resulting solution to the action of metallic zinc to precipitate copper and cadmium.

7. The method of purifying a zinc salt solution containing cadmium and an amount of copper in excess of about 1.0 gram per liter of solution which comprises treating the solution to precipitate a portion of the copper and establish in the solution an amount of copper equivalent to not less than about 0.12 gram and not more than about 1.0 gram per liter of solution, separating the solution from the precipitate, and subjecting the solution to the action of metallic zinc.

8. The method of purifying a zinc salt solution containing cadmium and an amount of copper in excess of about 0.50 gram per liter of solution which comprises treating the solution to precipitate a portion of the copper and establish in the solution an amount of copper equivalent to not less than about 0.25 gram and not more than about 0.50 gram per liter of solution, separating the solution from the precipitate, and subjecting the solution to the action of metallic zinc.

9. The method of purifying a zinc sulphate solution containing cadmium and an amount of copper in excess of about 1.0 gram per liter of solution which comprises subjecting the solution to the action of metallic zinc to precipitate a portion of the copper and establish in the solution an amount of copper equivalent to not less than about 0.25 gram and not more than about 0.50 gram per liter of solution, separating the solution from the precipitate, and again subjecting the solution to the action of metallic zinc to precipitate copper and cadmium.

10. The method of removing cadmium from a zinc salt solution which comprises establishing in the solution an amount of copper equivalent to not less than about 0.25 gram and not more than about 0.50 gram per liter of solution, and subjecting the resulting solution to the action of metallic zinc while avoiding contact of the solution with metallic lead.

11. The method of removing cadmium from a zinc salt solution which comprises incorporating in the solution an amount of copper equivalent to not less than about 0.12 gram and not more than about 1.0 gram per liter of solution, and subjecting the resulting solution to the action of metallic zinc while avoiding contact of the solution with metallic lead.

OLIVER C. RALSTON.
FAY H. MILLER.